(12) United States Patent
Nishikawa

(10) Patent No.: US 7,706,227 B2
(45) Date of Patent: Apr. 27, 2010

(54) INFORMATION RECORDING/REPRODUCTION APPARATUS

(75) Inventor: Koichiro Nishikawa, Takasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 11/275,647

(22) Filed: Jan. 20, 2006

(65) Prior Publication Data

US 2006/0171275 A1   Aug. 3, 2006

(30) Foreign Application Priority Data

Jan. 28, 2005   (JP)   ............... 2005-021449

(51) Int. Cl.
 G11B 27/36 (2006.01)
 G11B 7/00 (2006.01)

(52) U.S. Cl. ................... 369/53.2; 369/112.2

(58) Field of Classification Search ........... None
See application file for complete search history.

(56) References Cited

U.S. PATENT DOCUMENTS

| | | | | |
|---|---|---|---|---|
| 4,621,351 A | * | 11/1986 | Baer et al. | 369/44.25 |
| 4,970,707 A | * | 11/1990 | Hara et al. | 369/44.11 |
| 5,680,386 A | * | 10/1997 | Le Carvennec et al. | 369/116 |
| 6,324,133 B1 | * | 11/2001 | Ichimura | 369/44.27 |
| 6,381,208 B1 | * | 4/2002 | Abe et al. | 369/112.01 |
| 6,411,442 B1 | | 6/2002 | Ota et al. | |
| 6,876,501 B2 | | 4/2005 | Kimura et al. | |
| 6,898,168 B2 | | 5/2005 | Kimura et al. | |

(Continued)

FOREIGN PATENT DOCUMENTS

JP   2002-236252   8/2002

(Continued)

OTHER PUBLICATIONS

Japanese Office Action dated Nov. 10, 2009, issued in corresponding Japanese patent application No. 2005-021449, with an English translation.

*Primary Examiner*—Joseph H Feild
*Assistant Examiner*—Aneeta Yodichkas
(74) *Attorney, Agent, or Firm*—Fitzpatrick, Cella, Harper & Scinto

(57) ABSTRACT

An optical information recording/reproduction apparatus includes a correction device that corrects aberration, due to a change in thicknesses of a transparent substrate and spherical aberration generated by inserting an optical attenuation device into an optical path or retreating the optical attenuation device from the optical path, by changing intervals between a plurality of lenses. The correction device is disposed between an objective lens and a light source. The correction device also functions as a collimator lens. The optical attenuation device is provided in an optical path of diverging light flux from the light source to the correction device, for attenuating an optical output from the light source. A discrimination circuit discriminates (i) a kind of the optical recording medium and (ii) an insertion of the optical attenuation device into the optical path or a retreating of the optical attenuation device from the optical path, and produces a discrimination result. A learning circuit performs a learning process by searching for a correction amount, while the correction device changes the intervals between the plurality of lenses, and a circuit changes initial positions of the intervals between the plurality of lenses at a start of the learning process performed by the learning circuit, in accordance with the discrimination result produced by the discrimination circuit.

6 Claims, 7 Drawing Sheets

U.S. PATENT DOCUMENTS

| | | | |
|---|---|---|---|
| 6,934,226 B2 | 8/2005 | Yasuda et al. | 369/44.23 |
| 6,944,111 B2 * | 9/2005 | Nakamura et al. | 369/112.22 |
| 7,031,233 B2 * | 4/2006 | Ichimura | 369/44.11 |
| 7,035,194 B2 * | 4/2006 | Nakamura et al. | 369/112.17 |
| 7,065,013 B2 | 6/2006 | Yasuda et al. | 369/44.29 |
| 7,142,497 B2 | 11/2006 | Hirai | 369/112.17 |
| 7,245,407 B2 * | 7/2007 | Komma | 359/15 |
| 2003/0185134 A1 * | 10/2003 | Kimura et al. | 369/112.08 |
| 2004/0036972 A1 | 2/2004 | Kimura et al. | |
| 2004/0085885 A1 | 5/2004 | Kikuchi et al. | 369/112.24 |
| 2005/0254400 A1 | 11/2005 | Nishikawa | |
| 2007/0030770 A1 | 2/2007 | Hirai | 369/44.23 |

FOREIGN PATENT DOCUMENTS

| | | |
|---|---|---|
| JP | 2002-373441 | 12/2002 |
| JP | 2003-257072 | 9/2003 |
| JP | 2004-39125 | 2/2004 |
| JP | 2004-127473 | 4/2004 |
| JP | 2004-152426 | 5/2004 |

* cited by examiner

INFORMATION RECORDING/REPRODUCTION APPARATUS

This application claims priority from Japanese Patent Application No. 2005-021449, filed Jan. 28, 2005, which is hereby incorporated by reference herein.

BACKGROUND OF THE INVENTION

1. Field of the Invention

The present invention relates to an optical information recording and reproduction apparatus for recording information in an optical recording medium, such as an optical disk, or reproducing the recorded information from the optical recording medium, and, particularly, to the rationalization of a correction technique for correcting spherical aberration of an optical recording medium.

2. Related Background Art

In recent years, in the case of an optical disk apparatus, a technique corresponding to a change of making the wavelength of a light source shorter and a change of making the numerical aperture (NA) of an objective lens higher is vigorously studied, in order to make the density of a disk higher. Locally, commercialization of an apparatus using a 405 nm-band semiconductor laser and an objective lens of NA=0.85 is started.

Moreover, in order to make the capacity of a disk higher, a disk having two recording layers is used. However, when using the 405 nm-band semiconductor laser, its quantization noise, so-called laser diode (LD) noise, becomes a problem and, when using the objective lens of NA=0.85, spherical aberration due to error in the thickness of a transparent substrate or a jump operation between the layers of the double-layer disk becomes a problem.

Furthermore, the spherical aberration due to a jump operation between the layers cannot be ignored for a DVD of a red LD and an NA (numerical aperture) of about 0.65.

Therefore, when increasing the output power, because of the characteristic of a semiconductor laser (hereafter abbreviated as "LD"), LD noises are lowered. Accordingly, a technique for restraining LD noises by inserting an optical attenuation device, when a single-layer disk is used, is disclosed in Japanese Patent Application Laid-Open No. 2003-257072.

Moreover, a technique for generating a spherical aberration, by additionally using a beam expander and changing an interval between lenses to offset the spherical aberration due to a thickness error of a transparent substrate, is disclosed in Japanese Patent Application Laid-Open No. 2002-236252.

However, the above conventional techniques have the following problems.

That is, when inserting an optical filter between an LD and a collimator lens, this is effective for making an optical system compact, but an optical path length between the LD and the collimator lens depends on the presence or the absence of the optical filter. As a result, a case in which an optical filter is assumed as the reference stage of the optical path length between the LD and the collimator lens, the LD is present at a defocus position viewed from the collimator lens when the optical filter is not inserted. Then, the light flux after the collimator lens becomes convergent light, and when condensing the light to a disk by the optical lens, a large spherical aberration occurs.

However, a spherical aberration also occurs due to a thickness error of a transparent substrate of a disk or a thickness difference between layers. Therefore, by using spherical aberration correcting means, and searching the optimum state of the spherical aberration correcting means so that a signal quality serving as an index-signal becomes preferable, it is possible to correct spherical aberration occurring as a result.

Therefore, when searching the optimum state of the spherical aberration correcting means (hereafter, the searching of the optimum state of the spherical aberration correcting means is referred to as "spherical aberration learning"), the optimum state is searched by using an initial state serving as a reference as a start point. However, as described above, particularly, in the case of using an optical filter, the initial state is changed due to the presence or the absence of the optical filter. Therefore, in the case of spherical aberration learning, the range of the learning expands by at least a change of the initial state, and wasting of time of spherical aberration learning occurs.

Moreover, even if a system between an LD and a collimator lens is not changed, or even in the case of an apparatus capable of recording information on and reproducing information from a disk formed in accordance with a different format, for example, use of wavelengths different from each other, because the format differs, a spherical aberration amount to be corrected also differs. Therefore, it is necessary to widely set a learning range for spherical aberration learning, and by learning spherical aberration in accordance with the set range, a waste of learning time occurs.

SUMMARY OF THE INVENTION

An object of the present invention is to provide an optical information recording/reproducing apparatus which eliminates a waste of learning time for spherical aberration learning, and rationalizes the spherical aberration correcting operation.

The present invention makes it possible to provide an optical information recording/reproduction apparatus which can eliminate a waste of learning time for spherical aberration learning by changing the initial position for learning for every kind of an optical recording medium, before the operation of the spherical aberration learning, and to rationalize the operation of spherical aberration correcting.

Specifically, an optical information recording/reproduction apparatus, for recording information by leading a light flux from a light source to an objective lens and condensing the light flux through a transparent substrate to the recording face of an optical recording medium with the objective lens, or reproducing the information based on the light returned from the optical recording medium, includes:

a discrimination circuit for discriminating the kind of optical recording medium;

a correction device for correcting the aberration due to a change of thicknesses of the transparent substrate by changing intervals between a plurality of lenses;

a learning circuit for searching a correction amount while changing intervals of a plurality of lenses; and a circuit for changing initial positions of the intervals between the plurality of lenses at a start of learning, in accordance with a discrimination result by the discrimination circuit.

DESCRIPTION OF THE PREFERRED EMBODIMENTS

Now, preferred embodiments for executing the present invention are described below in detail with reference to the accompanying drawings.

First Embodiment

Figure 1:
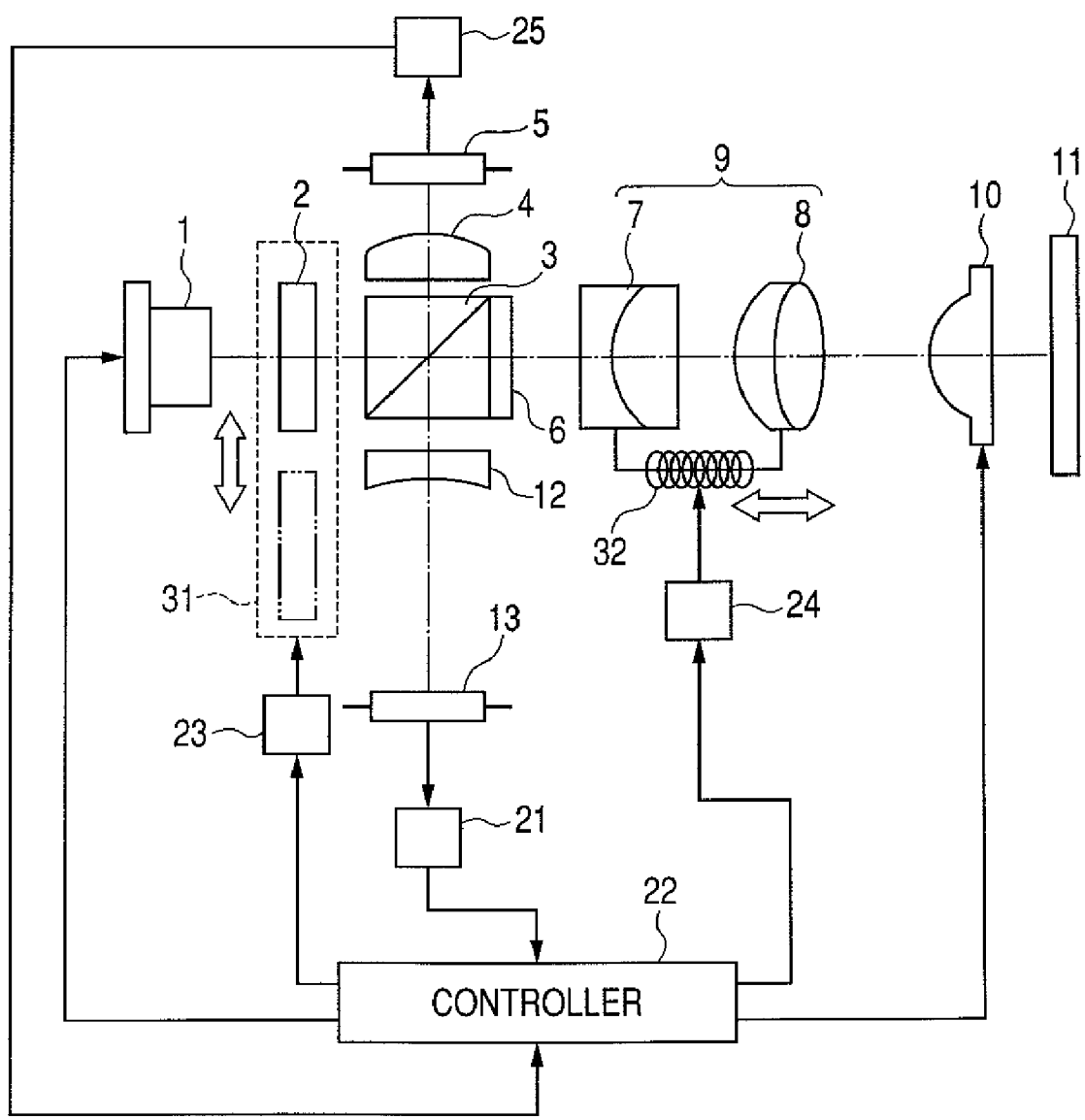
FIG. 1 is a block diagram showing a first embodiment of the present invention.

FIG. 1 is a block diagram showing a first embodiment of an optical information recording/reproduction apparatus of the present invention. First, the outline of an optical system is described below.

A part of a beam emitted from an LD (semiconductor laser) 1 is reflected by a PBS (polarization beam splitter) 3 and condensed onto a monitor PD (photodiode) 5 by a condensing lens 4. An output of the monitor PD 5 is used for control of power output from the LD 1. Reference numeral 25 denotes a signal detecting part for converting the photocurrent of the monitor PD 5 into a voltage signal.

An optical filter 2 is set between the LD 1 and the PBS 3. The optical filter 2 is a parallel flat plate provided with an optical thin film having a transmittance of 50%, which is constituted between the LD 1 and the PBS 3, so that it can be inserted and retreated according to necessity, in accordance with driving by an optical attenuation device-driving mechanism 31, and kept in an inserted state in the case of initialization.

A beam passing through the PBS 3 passes through a λ/4 plate 6 and enters a collimator lens 9 and becomes almost a parallel light flux. The parallel light flux is condensed by an objective lens 10 and imaged on a recording layer through the transparent substrate of an optical disk 11. Information is recorded on the optical disk 11 by modulation of an optical output by a modulation circuit (not shown). Moreover, the information is reproduced by scanning an information track with a low output of the LD 1, receiving the light reflected from the optical disk 11 by an RF servo PD 13 and conforming to the light receiving signal.

The collimator lens 9 is constituted of two groups of lens-group 7 and 8 and has a configuration capable of providing variable spherical aberration for a beam condensed to the optical disk 11 by changing the distance between the lens-groups. Reference numeral 32 denotes a spherical aberration correcting device-driving mechanism (for example, a stepping motor) for changing the distance between the lens groups by moving at least one of the lens-group 7 and 8 in the optical axis direction. Reference numeral 24 denotes a spherical aberration correcting device-driving part for driving the spherical-aberration correcting-device driving mechanism 32.

Figure 2A:
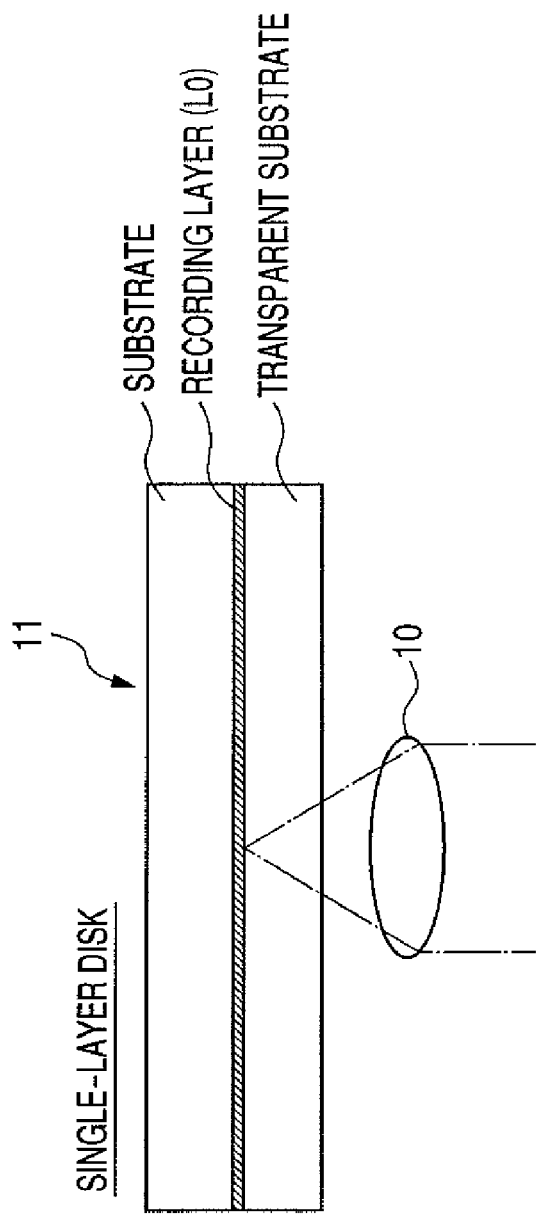
FIGS. 2A and 2B are illustrations showing a structure of a medium used for the first embodiment.
Figure 2B:
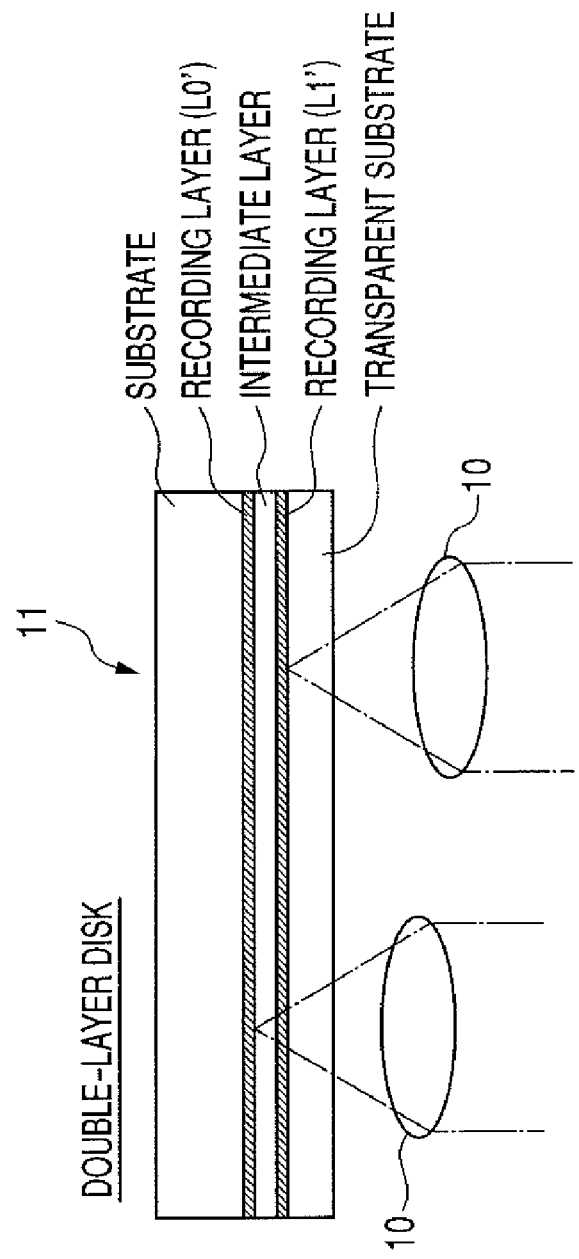

The optical disk 11 may include a single-layer disk having one recording layer, and a double-layer disk having two recording layers, and is formed of a transparent substrate, recording layers, an intermediate layer and a substrate, as shown in FIGS. 2A and 2B. FIG. 2A shows the single-layer disk and FIG. 2B shows the double-layer disk. In the case of this embodiment, the optical disk 11 changes initial positions for a learning start of the spherical aberration correcting means in the learning operation for searching an optimum spherical aberration correcting amount when the optical disk 11 is a single-layer disk and a double-layer disk.

When one assumes the recording layer of a single-layer disk to be L0, the recording layer of a double-layer disk far from the objective lens 10 as L0' and the recording layer of the double-layer disk close to the objective lens L1', the recording layer L0 of the single-layer disk and the recording layer L0' of the double-layer disk are almost equal, except for transmittance and reflectance viewed from the objective lens 10. Moreover, in the case of the double-layer disk, an address is sequentially assigned from L0' to L1'.

In the case of this embodiment, the wavelength of the LD1 is 405 nm, the focal distance of the collimator lens 9 is 13 mm, the distance between the groups of the collimator lens (distance between the collimator lens groups) is 0.8 mm for a reference, the numerical aperture of the objective lens 10 is 0.85 and the focal distance is 1.176 mm.

Moreover, when the optical disk 11 is a single-layer disk, a transparent substrate has a refractive index of about 1.6 and a thickness of 100 μm, and a recording layer has a thickness of about 0.1 μm. When the optical disk 11 is a double-layer disk, the transparent substrate has a refractive index of about 1.6 and a thickness of 75 μm, each recording layer has a thickness of about 0.1 μm and an intermediate layer has a refractive index of about 1.6 and a thickness of about 25 μm.

A beam reflected from the optical disk 11 enters the PBS 3 through the objective lens 10, collimator lens 9 and λ/4 plate 6. This incoming light flux is reflected by the PBS 3 and condensed onto the RF servo PD 13 by a sensor lens 12. An information signal and a servo signal can be obtained by an output from the RF servo PD 13. Moreover, a controller 22 is a control circuit for controlling each part in an apparatus, which controls the spherical aberration learning operation, and the like, to be described later.

Figure 3:
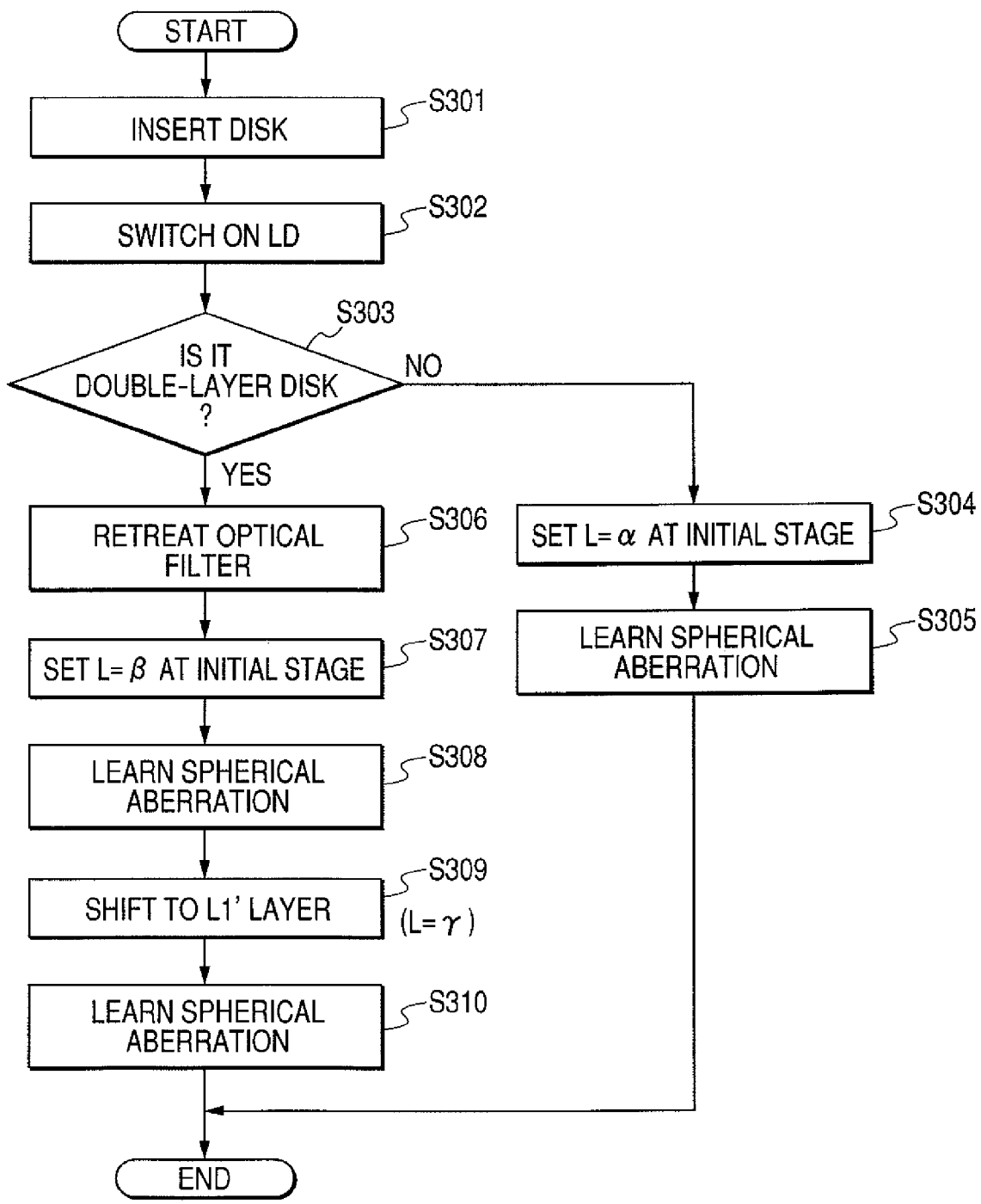
FIG. 3 is a flowchart showing operations of the first embodiment.

Then, a process from disk insertion to spherical aberration learning of this embodiment is described. FIG. 3 is a flowchart showing the operation.

First, the optical disk 11 is inserted into an apparatus (S301). At this stage, a single-layer disk or a double-layer disk is not known. In an initial state, the optical filter 2 is inserted between the LD 1 and PBS 3, as described above. When it is detected that the optical disk 11 is inserted, the controller 22 controls a laser driving circuit (not shown) to turn on the LD 1 (S302) and, under this state, sets the emission power of the objective lens 10 to 0.35 mW.

In the case of this embodiment, a mechanism for suppressing LD noise is prepared for a case of a single-layer disk. When the optical filter 2 is not between the LD 1 and PBS 3, an output of the LD 1, when an output from the objective lens 10 corresponds to 0.35 mW, approximately ranges between 2.4 and 3.0 mW, and an output of the LD1 approximately ranges between 4.8 and 6.0 mW by means of the optical filter 2. An output of the LD 1 is set to a range between 4.8 and 6.0 mW. Also, in the case of a double-layer disk, an output is almost the same. In this case, LD noise lowers to about −6 to −10 (dB) and S/N is improved to a large extent.

Then, the controller 22 discriminates whether the inserted optical disk 11 is a single-layer disk or a double-layer disk (S303). Specifically, the controller 22 slightly vertically moves the objective lens 10 to detect the peak value of the sum of outputs from the RF servo PD 13 by a signal detecting part 21. The controller 22 compares the output sum of the original detecting part 21 with a preset reference voltage. When the output sum is higher than the reference voltage, the controller 22 discriminates a single-layer disk, and when the output sum is lower than the reference voltage, it discriminates a double-layer disk.

In the case of a single-layer disk, the controller 22 controls the spherical aberration correcting device-driving part 24, and sets the initial position of the distance between the lens groups between the lens-group 7 and 8 of the collimator lens 9 to L=α by driving the spherical aberration driving mechanism 32 (S304).

As shown in FIG. 1, the collimator lens 9 is a two-group configuration of the lens-group 7 and 8. The relation between the distance between the lens groups (L) and the generated spherical aberration (W40), when combining the collimator lens 9 with the objective lens 10, is shown by graphs in FIG. 4.

Figure 4:
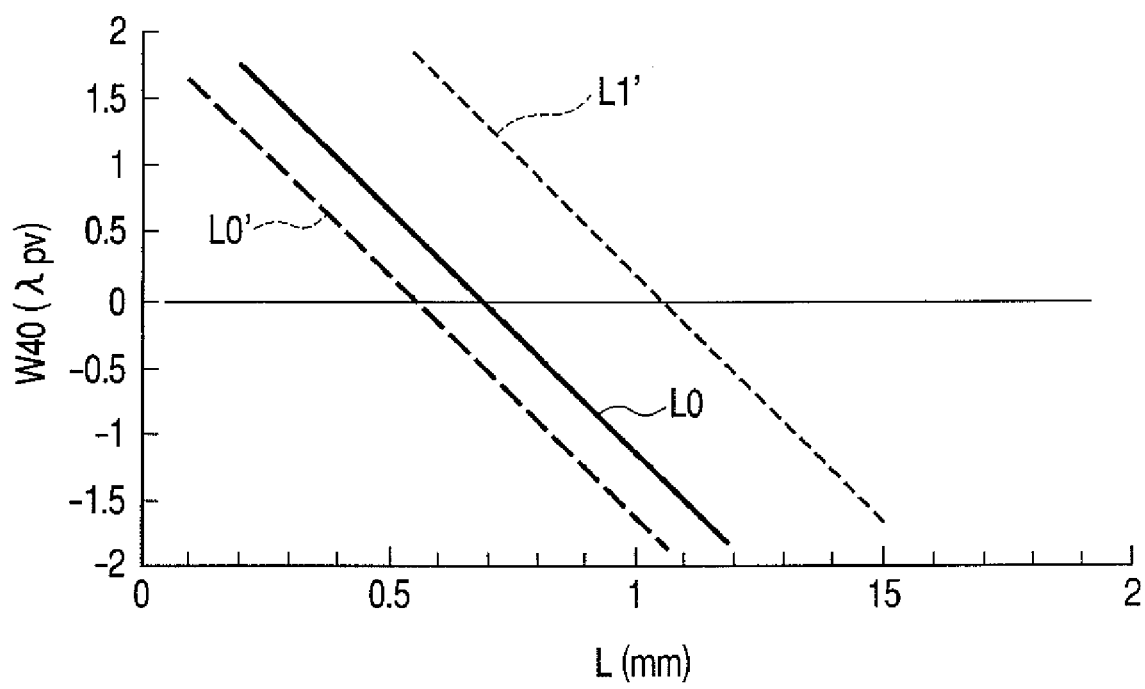
FIG. 4 is a graph showing a relation between a distance between the collimator lens group (L) and a generated spherical aberration (W40) of the first embodiment.

In FIG. 4, the relation between the distance between the lens groups (L) and the generated spherical aberration (W40) in recording/reproduction on the layers L0, L0' and L1' is plotted. As shown by the graphs in FIG. 4, it is found that the layer L0 is shifted by the distance between the lens groups corresponding to the spherical aberration generated by inserting the optical filter 2.

The shift amount is about 0.1 mm when the parallel flat plate constituting the optical filter 2 has a thickness of 1 mm, and about 0.15 mm when the parallel flat plate has a thickness of 1.5 mm. In the case of this embodiment, the thickness of the parallel flat plate of the optical filter 2 is set to 1 mm.

Therefore, in the case of this embodiment, the reference value of the distance between the lens groups (L) of the collimator lens 9 is approximately equal to 0.68 mm for a single-layer disk. Moreover, in the case of a double-layer disk, the reference value is approximately equal to 0.55 mm for the layer L0' and 1.65 mm for the layer L1'.

Therefore, in this embodiment, in the case of a single-layer disk, it is normal that L, nearly equal to 0.68 mm, is used as an initialization value, and in the case of a double-layer disk, since L0' is used in accordance with an address, L nearly equal to 0.55 mm is used as the initialization value. In S304, the initialization value is set to α nearly equal to 0.68 mm.

Then, the controller 22 controls each part and learns spherical aberration for searching an optimum distance between the lens groups at which spherical aberration disappears (S305). In this case, the distance between the lens groups of the collimator lens 9 is set to the initialization value in accordance with the control by the controller 22, as described above.

A reproduction signal amplitude value, corresponding to the distance between the lens groups, is detected by the signal detecting part 21, while changing the distance between the lens groups of the collimator lens 9 at predetermined intervals in a predetermined width (range) centering around the initial position. The controller 22 performs processing by relating the corresponding reproduction signal amplitude with the distance between the lens groups to detect a lens group distance of the collimator lens 9 at which the reproduction signal amplitude value is maximized. When the controller 22 detects the distance between the lens groups at which the reproduction signal amplitude is maximized, the controller 22 controls the spherical aberration correcting device-driving part 24 to set the part 24 to an optimum distance between the lens groups at which the reproduction signal amplitude value is maximized.

In this case, the spherical aberration value becomes almost zero, and spherical aberration is corrected. In the case of this embodiment, the above learning operation is performed by cutting a width of ±20 mm at every 0.02 mm interval, which corresponds to a width of ±10 μm, and an interval of 1 μm in a transparent substrate thickness error.

Next, described is the operation when the disk is determined to be a double-layer disk, in S303. In the case of the double-layer disk, the reflectance and absorption coefficient of a recording layer are about a half of the case of a single-layer disk, and a light quantity to be irradiated to the disk becomes about two times. Therefore, LD output power rises, and LD noise is restrained. Consequently, the controller 22 controls an optical attenuation device-driving part 23 to retreat the optical filter 2 from the gap between the LD 1 and PBS 3 by driving the optical attenuation device-driving mechanism 31 (S306).

In this case, the LD 1 is once turned off, and after the optical filter 2 is retreated, the LD 1 is turned on again. The optical attenuation device-driving mechanism 31 is a mechanism for inserting or evacuating the optical filter 2 between the LD 1 and PBS 3, and the optical attenuation device-driving portion 23 is a driving part for driving the optical attenuation device-driving mechanism 31 in accordance with control by the controller 22.

Then, the controller 22 controls the spherical aberration correcting device-driving part 24 to set the initial position of the distance between the lens groups of the collimator lens 9 to L=β by driving the spherical aberration correcting device-driving mechanism 32 (S307). In the case of this embodiment, β is approximately equal to 0.55 mm, as described above. This corresponds to the layer L0'.

Moreover, spherical aberration is learned similarly as in a case of a single-layer disk (S308). That is, the spherical aberration correcting device-driving portion 24 is controlled, and a reproducing-signal amplitude value is detected by the signal detecting portion 21, while changing the distance between the lens groups at predetermined intervals in a predetermined width centering around the initial position. Then, a distance between the lens groups, at which a reproduction signal amplitude is maximized, is detected and stored in the controller 22.

Then, learning of the layer L1' is started (S309). In this case, the controller 22 controls the spherical aberration correcting device-driving part 24 to set the initial position of the distance between the lens groups of the collimator lens 9 to L=γ. In the case of this embodiment, γ is approximately equal to 1.05 mm, as described above.

Then, spherical aberration for L=γ is similarly learned (S310). That is, the controller 22 controls the spherical aberration correcting device-driving part 24 to detect a reproduction signal amplitude by the signal detecting part 31, while changing a distance between the lens groups at predetermined intervals in a predetermined width centering around an initial position. Moreover, the distance between the lens groups of the collimator lens 9, at which the reproduction signal amplitude is maximized, is detected and stored in the controller 22. Thus, learning of spherical aberration is completed.

Thereafter, in the case of recording information in or reproducing information from a double-layer disk, the controller 22 sets a distance between the lens groups to an optimum value corresponding to each layer, to record or to reproduce information in or from the layers L0' and L1'.

Thus, because the initial position of the distance between the lens groups of the collimator lens 9 is changed in accordance with the kind of the optical disk 11 (single-layer disk or double-layer disk), whereby waste learning is not performed, it is possible to decrease the time of spherical aberration learning of an apparatus capable of avoiding LD noise.

Second Embodiment

Figure 5:
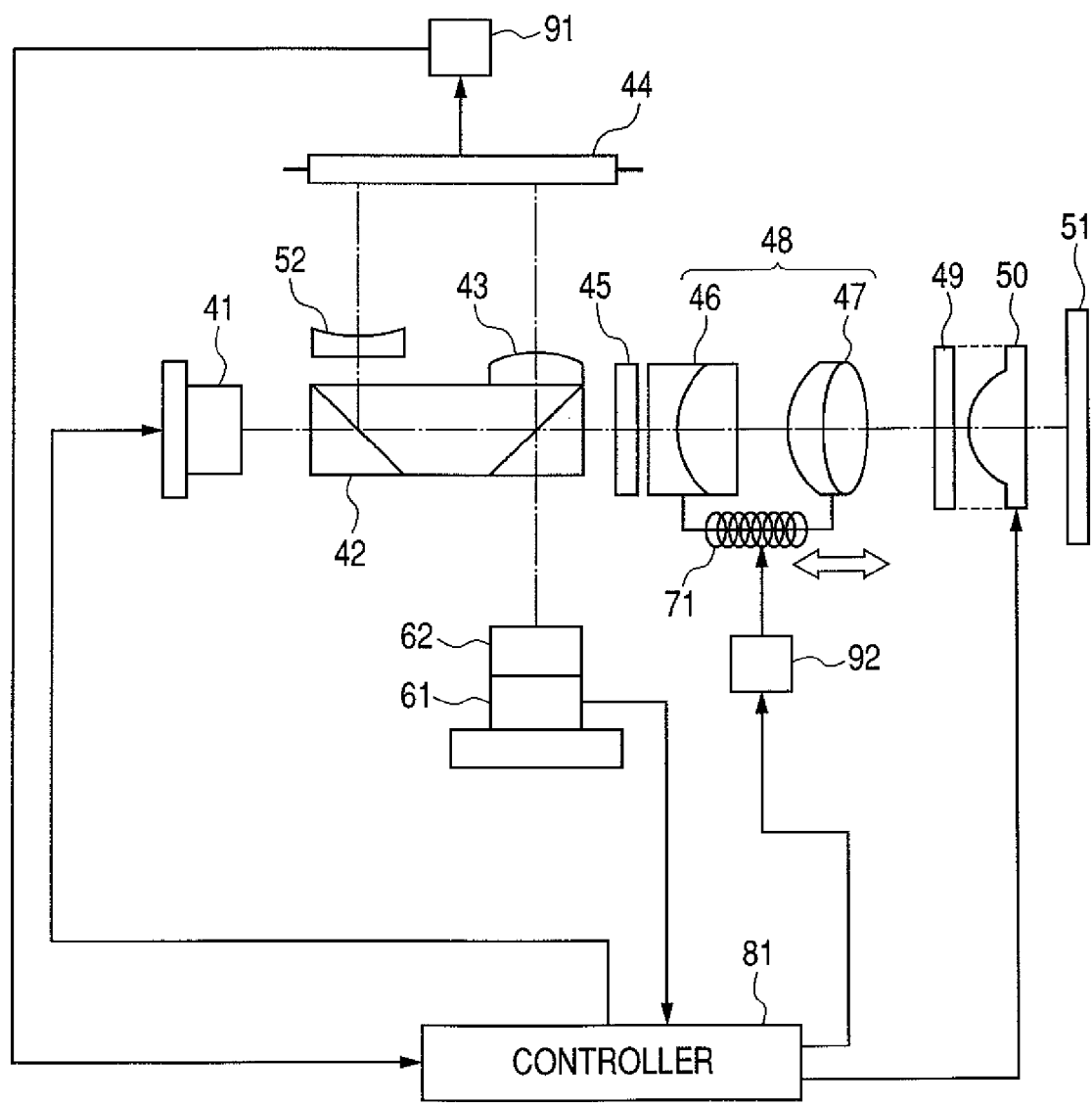
FIG. 5 is a block diagram showing a second embodiment of the present invention.

FIG. 5 is a block diagram showing a second embodiment of the present invention. In the case of this embodiment, initial positions of spherical aberration learning of spherical aberration correcting means are changed in accordance with the fact that an optical disk to be used is a disk corresponding to a blue LD or a disk corresponding to a red LD. First, the outline of an optical system, when a disk to be used is a disk corresponding to a blue LD, is described.

A part of a beam emitted from an LD (semiconductor layer) 41 is reflected by a composite SB 42 and condensed to a light-receiving area for a monitor of a PD (photodiode) 44 by a condensing lens 43. This output is used for control of emission power of the LD 41. PD 44 has a light-receiving area for a monitor and an RF servo area.

The beam passing through the composite BS 42 is changed to an almost parallel light flux by a collimator lens 48 through a λ/4 plate 45 and, moreover, the parallel light flux passes through a wavelength selection phase plate 49 and is imaged on a recording layer through a transparent substrate of an optical disk 51 by an objective lens 50. When information is read in the optical disk 51, the information is recorded through modulation of information light output by a modulation circuit (not shown). Moreover, when reproducing the information, an information track is scanned with a low output of the LD 41, the reflected light is received, and the information is reproduced in accordance with the light-receiving signal.

When the optical disk 51 is a disk corresponding to a blue LD, reproduction is performed in accordance with the light-receiving signal of the RF servo area of the PD 44. When the optical disk is a disk corresponding to a red LD, reproduction is performed in accordance with a light-receiving signal condensed to a photodiode (not shown) in an integrated unit 61. The same is applied when obtaining a servo signal. Moreover, when performing the learning operation to be described later, learning is similarly performed in accordance with a light-receiving signal in the RF servo area of the PD 44, in the case of a disk corresponding to a blue LD, and learning is performed in accordance with a light-receiving signal of the photodiode in the integrated unit 61 in the case of a disk corresponding to a red LD.

In this case, a PBS film is formed on the separate face of the composite BS 42, not the LD 41 side, to constitute an optical isolator in accordance with a combination with the λ/4 plate 45. Moreover, the collimator lens 48 is constituted of two groups of lens group 46 and 47, so as to be able to provide variable spherical aberration for a beam condensed to the optical disk 51 by changing the distance between the lens groups. Furthermore, the wavelength-selection phase plate 49 is held integrally with the objective lens 50.

A beam reflected by the optical disk 51 enters the composite BS 42 through the objective lens 50, collimator lens 48 and λ/4 plate 45. This incoming light flux is reflected by the composite BS 42 and condensed on the RF servo area of the PD 44 by a sensor lens 52. An information signal and a servo signal can be obtained in accordance with an output from the RF servo area.

In this case, the collimator lens 48 is constituted of two groups of the lens-group 46 and 47, as described above, which can provide spherical aberration for a beam condensed to the optical disk 51 by changing the distance between the lens groups. A spherical aberration correcting device-driving mechanism 71 is a driving mechanism for changing the distance between the lens groups by moving at least one of the lens-groups 46 and 47 in the optical axis direction, and reference numeral 92 denotes a driving part for driving the spherical aberration correcting device-driving mechanism 71 under the control of the controller 81. The spherical aberration correcting device-driving mechanism 71 uses, for example, a stepping motor.

In the case of this embodiment, the wavelength of the LD 41 is 405 nm, the focal distance of the collimator lens 48 is 13 mm, the distance between the lens groups of the collimator lens 48 is 0.8 mm, as a reference, the numerical aperture of the objective lens 50 is 0.85, and the focal distance of the lens 50 is 1.176 mm.

The optical disk 51 includes a single-layer disk having one recording layer and a double-layer disk having two recording layers, and is constituted of a transparent substrate, recording layers, an intermediate layer and a substrate, as in the case of the recording medium shown in FIGS. 2A and 2B. Moreover, it is assumed that recording and reproduction are performed at a wavelength of 405 nm and an objective-lens numerical aperture of 0.85.

In this case, it is assumed that the recording layer of a single-layer disk is L0, the recording layer of a double-layer disk far from the objective lens 50 is L0, and the recording layer close to the objective lens 50 is L1. In the case of the double-layer disk, an address is sequentially assigned from L0 to L1.

Moreover, in the case of the single-layer disk, the transparent substrate has a refractive index of about 1.6 and a thickness of 100 μm, and the recording layer has a thickness of about 0.1 μm. In the case of the double-layer disk, the transparent substrate has a refractive index of about 1.6 and a thickness of 75 μm, each recording layer has a thickness of about 0.1 μm, and the intermediate layer has a refractive index of about 1.6 and a thickness of 25 μm. Because the recording layer of the single-layer disk and the recording layer of the double-layer disk far from the objective lens are regarded to be almost the same, as they are assumed to be L0, as a generic term.

Then, the outline of an optical system when a disk to be used is a disk corresponding to a red LD is described below. In the case of the integrated unit 61, a red (660-nm band) LD chip, a photodiode and a preamplifier are integrated. Moreover, in the case of a hologram device 62, a diffraction grating is set to the integrated unit 61 side, a polarized hologram structure is formed at the facing side, and the integrated unit 61 and the hologram device 62 are integrally held.

A part of a beam emitted from the red (660-nm band) LD chip in the integrated unit 61 passes through the composite BS 42 and is condensed to the light-receiving area for a monitor for the PD 44 by the condensing lens 43. This output is used for the control of the power emitted from the LD chip.

The beam reflected by the composite BS 42 is changed to almost a parallel light flux by the collimator lens 48 through the λ/4 plate 45. The parallel light flux passes through the wavelength election phase plate 49 and is imaged on a recording layer through the transparent substrate of the optical disk 51 by the objective lens 50. Information is recorded in accordance with modulation of an optical output by a modulation circuit (not shown). When the information is reproduced, an information track is scanned with a low output, the light reflected from the track is condensed to a photodiode in the integrated unit 61 and the information is reproduced in accordance with the light-receiving signal.

In this case, the wavelength selection phase plate 49 has an aperture-size limit function by a wavelength selection filter for using the objective lens 50 as NA=0.65, as publicly known, as well as a phase distribution for correcting initial spherical aberration generated when different from a designed wavelength and designed substrate thickness.

The optical disk 51 includes a disk composed of one or two recording layers corresponding to a red LD and an objective-lens numerical aperture of 0.60 to 0.65, a transparent substrate, an intermediate layer and a substrate, as described for the first embodiment.

In this case, it is assumed that the recording layer of a single-layer disk of a red-LD-corresponding disk, or the recording layer of a double-layer disk far from the objective lens 50, is a layer L0' and a recording layer of the double-layer disk close to the objective lens 50 is a layer L1'. This represents that the recording layer of the single-layer disk and the recording layer of the double-layer disk far from the objective lens 50 have the same transparent substrate thickness when viewed from the objective lens 50. Moreover, in the case of the double-layer disk, an address is sequentially assigned from L0' to L1'.

The wavelength of the light from the integrated unit 61 is 660 nm, and the focal distance of the collimator lens 48 at the wavelength is about 13 mm, because the lens 48 has an achromatic configuration, the distance between the lens groups of the collimator lens 48 is 0.8 mm, as a reference, and the focal distance of the objective lens 50 is about 1.18 mm.

Moreover, in the case of the optical disk 51, the reference distance from the surface of the red LD corresponding disk is 0.6 mm for the layer L0' and 0.54 mm for the layer L1'.

Figure 6:
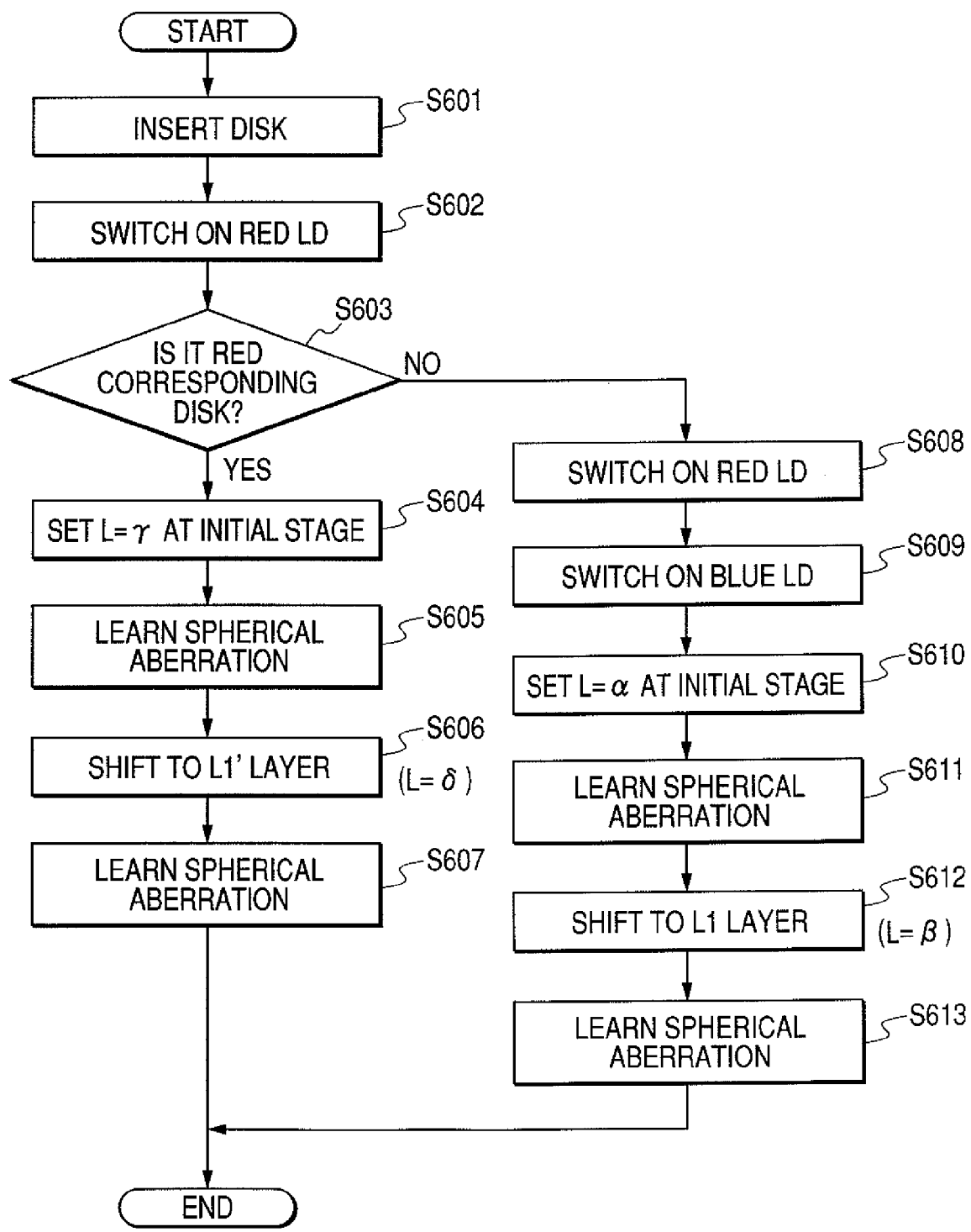
FIG. 6 is a flowchart showing operations of a second embodiment.

Then, a process from disk insertion to spherical aberration learning of this embodiment is described below. FIG. 6 is a flowchart showing operations of the process.

First, the optical disk 51 is inserted (S601). At this stage, it is unknown that the disk is a disk corresponding to a red LD or a disk corresponding to a blue LD. When it is detected that the optical disk 51 is inserted, a controller 81 controls a laser driving circuit (not shown) to turn on a red LD in the integrated unit 61 (S602).

Moreover, the controller 81 controls each part to reproduce the disk information area of the optical disk 51, and discriminates a disk corresponding to a red LD when disk information is obtained, in accordance with a signal from a signal detecting part 91, and a disk corresponding to a blue LD when the disk information is not obtained.

Thus, the kind of a disk is discriminated in accordance with whether disk information can be reproduced or not. In this case, the signal detecting part 91 uses a signal in the RF servo area of the PD44 as a voltage signal, and the controller 81 reproduces the disk information in accordance with the signal. Moreover, when the disk information can be reproduced, the information showing that the recording layer of the optical disk 51 is a single-layer or a double-layer is included in the disk information, and it is found that the inserted disk is a single-layer disk or a double-layer disk, in accordance with the information.

In the case of the disk corresponding to a red LD, the controller 81 controls the spherical-aberration correcting device-driving part 92 to set the distance between the lens groups of the collimator lens 48 to an initial position L=γ by driving the spherical aberration correcting device-driving mechanism 71 (S604).

Figure 7:
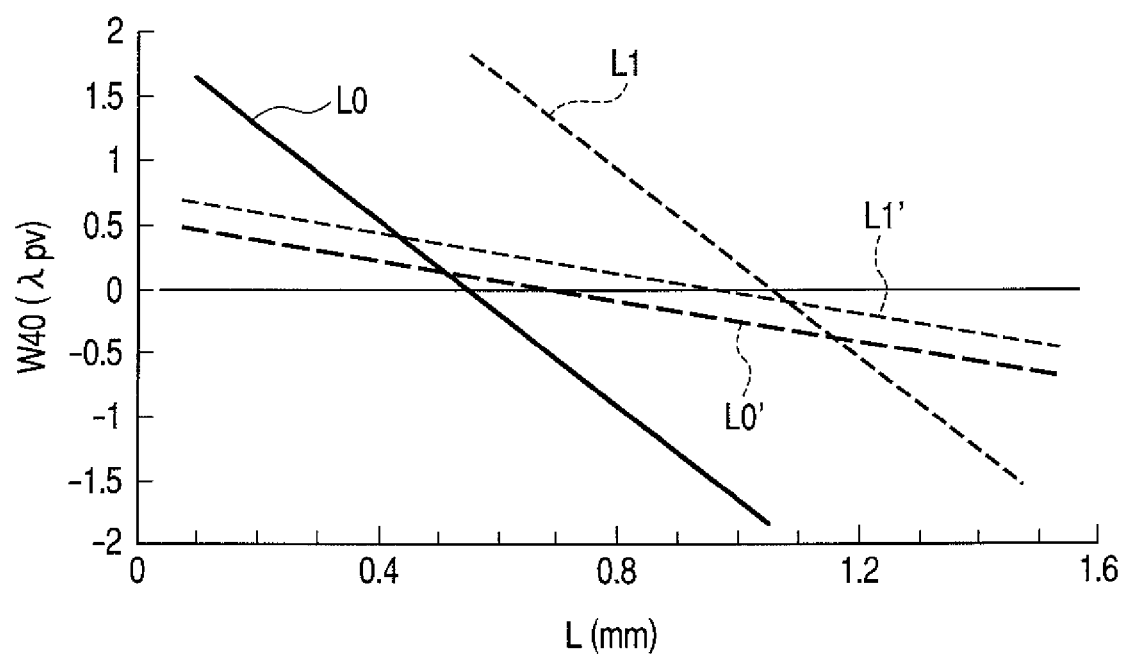
FIG. 7 is a graph showing a relation between a distance between the collimator lens group (L) and a generated spherical aberration (W40) in the second embodiment.

As shown in FIG. 5, the collimator lens 48 is constituted of two groups of lens-group 46 and 47, and the relation between the distance between the lens groups (L) and the generated spherical aberration (W40), according to a combination of the collimator lens 48 and the objective lens 50 through the wavelength selection phase plate 49, is shown by a graph in FIG. 7.

The relation between the distance between the lens groups (L) and the generated spherical aberration (W40) in the case of the disk corresponding to a red LD is plotted as the layer L0' and L1' in the graph. The reference value of the distance between the lens groups (L) of the collimator lens 48 is nearly equal to 0.68 mm for the layer L0' and nearly equal to 0.92 mm for the layer L1'. Because it is normal that L0' is first used in view of an address, L nearly equal to 0.68 nm is used as an initialization value. Therefore, in this step, γ set to about 0.68 is realized.

Then, the controller 81 controls each part to perform the spherical aberration learning for searching an optimum distance between the lens groups (S605). That is, similar to the case of the first embodiment, the controller 81 controls the spherical aberration correcting device-driving part 92, and a corresponding reproduction signal amplitude is detected from a light-receiving signal of the photodiode of the integrated unit 61, while changing the distance between the lens groups of the collimator lens 48 at a predetermined interval in a predetermined width (range) centering around the initial position.

The controller 81 performs processing by relating the distance between the lens groups of the collimator lens 48 with a reproduction signal amplitude, detects the distance between the lens groups of the collimator lens 48 when the reproduction signal amplitude is maximized, and stores the detected distance between the lens groups in the controller 81.

In this case, a spherical aberration value becomes almost zero, and spherical aberration is corrected. In this case, the above learning operation is performed by cutting a width of ±0.12 mm for every 0.02 mm interval, which corresponds to a width of ±30 μm and an interval of about 5 μm in a transparent substrate thickness error.

Then, learning of the layer L1' is started (S606). In this case, the controller 81 controls the spherical aberration correcting device-driving part 92 to set the distance between the lens groups of the collimator lens 48 to the initial position L=δ. In this case, δ is approximately equal to 0.92 mm, as described above.

When a single-layer disk is discriminated in accordance with the reproduced disk information, this step (S606) and the next step (S607) are unnecessary.

Then, the controller 81 similarly performs spherical aberration learning (S607). That is, the controller 81 controls the spherical aberration correcting device-driving part 92 to detect a reproduction signal amplitude, while changing the distance between the lens groups at a predetermined interval in the above-described predetermined width, centering around an initial position. Moreover, the distance between the lens groups of the collimator lens 48, at which the reproduction signal amplitude is maximized, is detected and stored in the controller 81.

Thereafter, when recording information in or reproducing information from the double-layer disk, the controller 81 sets the distance between the lens groups of the collimator lens to an optimum value corresponding to each stored layer, and records or reproduces information in or from each layer.

Then, operations when a disk corresponding to a blue LD is discriminated, in S603, are described. First, the controller 81 turns off a red LD (S608). Moreover, the controller 81 turns on the LD 41 (blue LD) and reproduces disk information (S609). The information showing whether the optical disk 51 is a single-layer disk or a double-layer disk is included in the disk information.

Then, the controller 81 controls the spherical aberration correcting device-driving part 92, to set the distance between the lens groups of the collimator lens 48 to the initial position L=α (S610).

The relation between the distance between the lens groups (L) and the generated spherical aberration (W40) in accordance with a combination of the collimator lens 48 and the objective lens 50 through the wavelength selection phase plate 49 is shown by the graph of FIG. 7.

In the case of the disk corresponding to a blue LD, the relation between the distance between the lens groups (L) and the generated spherical aberration (W40) is plotted as the layers L0 and L1. The reference value of the distance between the lens groups (L) of the collimator lens 48 is nearly equal to 0.55 mm for the layer L0 and nearly equal to 1.05 mm for the layer L1. Therefore, because it is normal that a layer is used, starting with the layer L0 in view of an address, L nearly equal to 0.55 mm is used as an initialization value. In this step, α nearly equal to 0.55 mm is realized.

Then, the controller 81 controls each part to similarly learn spherical aberration (S611). That is, the controller 81 controls the spherical aberration correcting device-driving part 92 to detect a reproduction signal amplitude by the signal detecting part 91, while changing the distance between the lens groups at a predetermined interval in a predetermined width centering around an initial position. Moreover, a distance between the lens groups at which the reproducing signal amplitude is maximized is detected, to store it in the controller 81. In this case, the above learning operation is performed by cutting a width of ±0.20 mm every 0.02 mm interval, which corresponds to a width of ±10 μm and an interval of about 0.02 mm in a transparent substrate thickness error.

Then, learning of the layer L1 is started (S612). In this case, the spherical aberration correcting device-driving part 92 is controlled, and the distance between the lens groups of the collimator lens 48 is set to an initial position L=β. In this case, β is approximately equal to 1.05 mm, as described above.

In this case, when a single-layer disk is discriminated in accordance with the reproduced disk information, this step (S612) and the next step (S613) are unnecessary.

Then, the controller 81 similarly learns spherical aberration (S613). That is, the controller 81 controls the spherical aberration correcting device-driving part 92 and detects a reproduction signal amplitude by the signal detecting part 91, while changing the distance between the lens groups at a predetermined interval in a predetermined width, centering around an initial position. Moreover, the distance between the lens groups, at which the reproducing signal amplitude is maximized, is detected and stored in the controller 81.

Thereafter, when recording information in or reproducing information from the double-layer disk, the controller 81 sets the distance between the lens groups of the collimator lens to an optimum value corresponding to each of the stored layers, and the recording or reproduction of information is performed in each layer.

Thus, in the case of this embodiment, initial positions of the distance between the lens groups of the collimator lens 48 are changed in accordance with the kind of a disk (disk corresponding to a red LD or a disk corresponding to a blue LD). Therefore, it is possible to decrease the time of spherical aberration learning in an apparatus capable of utilizing different kinds of recording/reproducing disks, corresponding to different wavelengths and numerical apparatuses.

Moreover, in the case of the above embodiment, spherical aberration is corrected by using a collimator lens constituted of two groups of lenses. However, it is also allowed to correct spherical aberration by setting an exclusive lens system, the so-called expander lens (constituted of a pair of lenses respectively capable of changing relative position of a lens) in an optical path without combining with the collimator lens.

What is claimed is:

1. An optical information recording/reproduction apparatus for recording information by leading light flux from a light source to an objective lens and condensing the light flux through a transparent substrate to a recording face of an optical recording medium with the objective lens, or reproducing the information based on light returned from the optical recording medium, the apparatus comprising:

a correction device for correcting aberration, due to a change in thicknesses of the transparent substrate and spherical aberration generated by inserting an optical attenuation device into an optical path or retreating the optical attenuation device from the optical path, by changing intervals between a plurality of lenses, wherein (i) the correction device is disposed between the objective lens and the light source, (ii) the correction device also functions as a collimator lens, and (iii) the optical attenuation device is provided in an optical path of diverging light flux from the light source to the correction device, for attenuating an optical output from the light source;

a driving mechanism for inserting the optical attenuation device into the optical path or retreating the optical attenuation device from the optical path;

a discrimination circuit for discriminating (i) a kind of the optical recording medium and (ii) an insertion of the optical attenuation device into the optical path or a retreating of the optical attenuation device from the optical path, and for producing a discrimination result;

a learning circuit for performing a learning process by searching for a correction amount, while the correction device changes the intervals between the plurality of lenses; and a circuit for changing initial positions of the intervals between the plurality of lenses at a start of the learning process performed by the learning circuit, in accordance with the discrimination result produced by the discrimination circuit.

2. The apparatus according to claim 1, wherein the discrimination circuit discriminates whether the optical recording medium is a single-layer recording medium having one recording layer or a double-layer recording medium having two recording layers.

3. The apparatus according to claim 2, wherein, when the discrimination circuit discriminates that the optical recording medium is a double-layer recording medium, the learning circuit performs a learning process to search for a correction amount on the double-layer recording layer of the optical recording medium, and further comprising a storage device for storing a result of the learning process performed by the learning circuit.

4. The apparatus according to claim 1, wherein the discrimination circuit discriminates whether the optical recording medium is a red-corresponding medium, corresponding to a red light source, or a blue-corresponding medium, corresponding to a blue light source.

5. The apparatus according to claim 4, wherein, in each case of the discrimination circuit discriminating a red-corresponding medium or a blue-corresponding medium, the discrimination circuit discriminates whether the recording layer of the optical recording medium is a single-layer recording medium or a double-layer recording medium, and when the optical recording medium is a two-layer recording medium, the learning circuit performs a learning process to search for a correction amount on each of the two recording layers, and further comprising a storage device for storing a result of the learning process performed by the learning circuit.

6. The apparatus according to claim 1, wherein the correction device includes a pair of lenses, and the correction device corrects the aberration by changing distances between the lenses.

* * * * *